(12) United States Patent
Noma et al.

(10) Patent No.: US 8,331,787 B2
(45) Date of Patent: Dec. 11, 2012

(54) OPTICAL TRANSMITTING APPARATUS AND OPTICAL MULTIPLEXING UNIT

(75) Inventors: Takeshi Noma, Fukuoka (JP); Haruki Tanaka, Fukuoka (JP); Yoshikazu Nakanishi, Fukuoka (JP); Makoto Ohtou, Fukuoka (JP); Hideaki Sugiya, Kawasaki (JP); Ichiro Nakajima, Kawasaki (JP); Toshihiro Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 887 days.

(21) Appl. No.: 12/385,071

(22) Filed: Mar. 30, 2009

(65) Prior Publication Data

US 2009/0310969 A1   Dec. 17, 2009

(30) Foreign Application Priority Data

Jun. 13, 2008   (JP) .................. 2008-155942

(51) Int. Cl.
*H04J 14/02* (2006.01)
*H04J 14/00* (2006.01)
*H04B 10/04* (2006.01)

(52) U.S. Cl. ............. 398/94; 398/49; 398/197; 398/198
(58) Field of Classification Search .................. 398/49, 398/197, 198
See application file for complete search history.

(56) References Cited

U.S. PATENT DOCUMENTS

2003/0147647 A1 *   8/2003   Funami et al. .................. 398/79

FOREIGN PATENT DOCUMENTS

JP   2007-067758   3/2007

* cited by examiner

*Primary Examiner* — Dawayne A Pinkney
(74) *Attorney, Agent, or Firm* — Staas & Halsey LLP

(57) ABSTRACT

Even during a protection period in which a state transition is not caused from an ALC state to an ALD state, when an output light level that is inputted is below a threshold for ALC transition read from a memory, a processor causes a transition by switching an internal state from an ALC state to an ALD state. Then, an ALD operation is started, outputting a control voltage to a VAT control unit so as to achieve a predetermined fixed attenuation amount.

7 Claims, 16 Drawing Sheets

FIG.6

| ITEM | CONTROL TIME (tn: n1, 2, ···) | FLUCTUATION AMOUNT (dn: n1, 2, ···) | CONTROL CONDITION | VAT CONTROL OPERATION |
|---|---|---|---|---|
| 1 | t1 | d1≤X | [B] | NORMAL ALC OPERATION |
| 2 | t2 | d2>X | [C] | CURRENT ATTENUATION AMOUNT |
| 3 | t3 | d3>X | [D] | INCREASE ATTENUATION AMOUNT BY Z [dB] |
| 4 | t4 | d4≤X | [B] | NORMAL ALC OPERATION |
| 5 | t5 | d5>X | [D] | INCREASE ATTENUATION AMOUNT BY Z [dB] |
| 6 | t6 | d6>X | [D] | INCREASE ATTENUATION AMOUNT BY Z [dB] |
| 7 | t7 | d7>X | [A] | MAKE TRANSITION TO ALD STATE |

FIG.7

[A] WHEN CURRENT OUTPUT LEVEL IS BELOW THRESHOLD
FOR TRANSITION TO ALC
→CAUSE TRANSITION TO ALD

[B] WHEN OUTPUT FLUCTUATION AMOUNT IS SMALLER THAN X [dB]
→TAKE CONVENTIONAL FEEDBACK AMOUNT AS-IS

[C] WHEN OUTPUT FLUCTUATION AMOUNT IS GREATER THAN X [dB]
AND CURRENT OUTPUT LEVEL IS SMALLER THAN Y [dB]
→TAKE FEEDBACK AMOUNT AS 0
  (DO NOT CHANGE VAT ATTENUATION AMOUNT)

[D] WHEN OUTPUT FLUCTUATION AMOUNT IS GREATER THAN X [dB]
AND CURRENT OUTPUT LEVEL IS EQUAL TO OR GREATER THAN Y [dB]
→TAKE FEEDBACK AMOUNT AS Z [dB]
  (INCREASE FIXED ATTENUATION AMOUNT BY Z [dB])

EXAMPLE: X=3 [dB], Y=-24 [dB], Z=3 [dB]

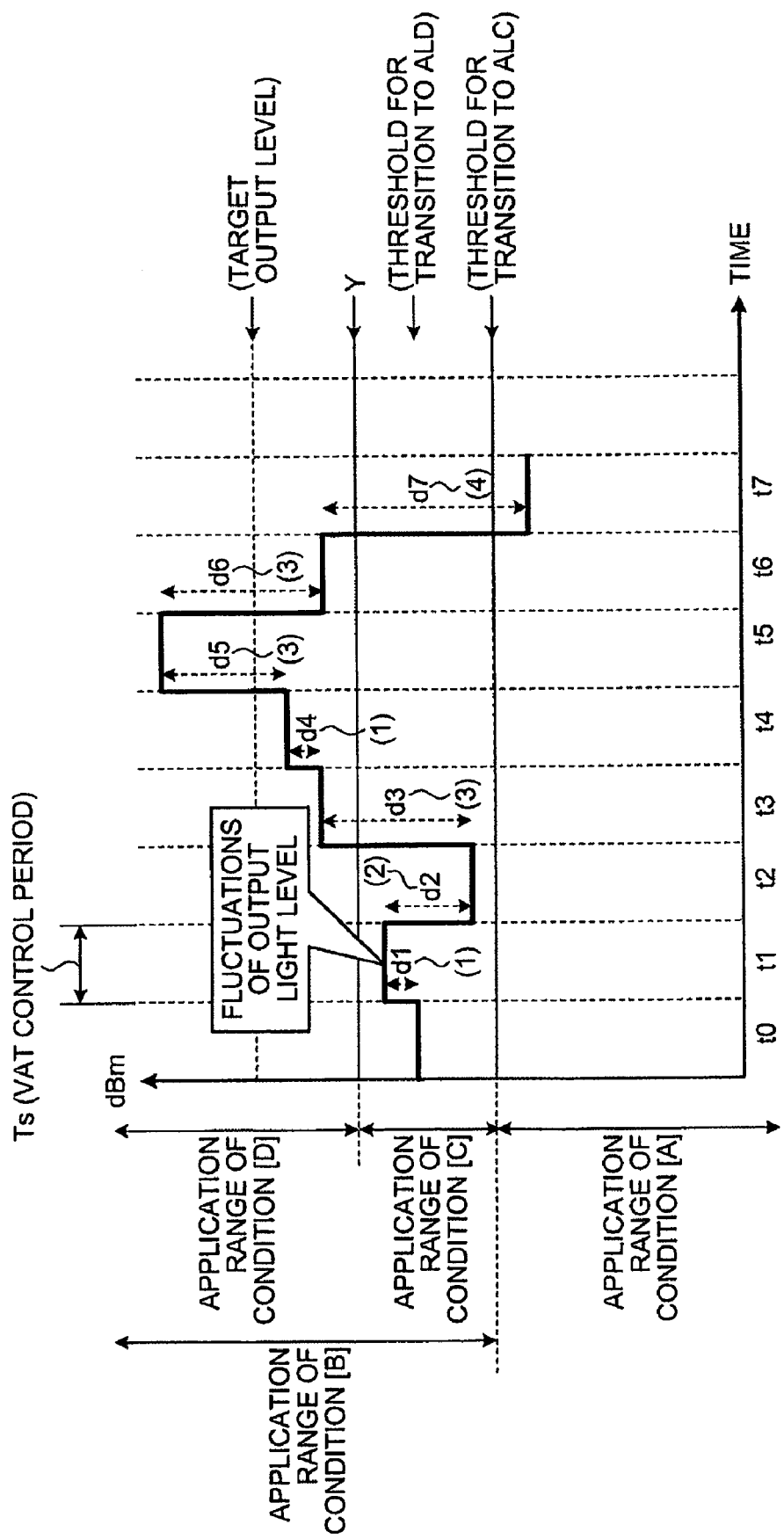

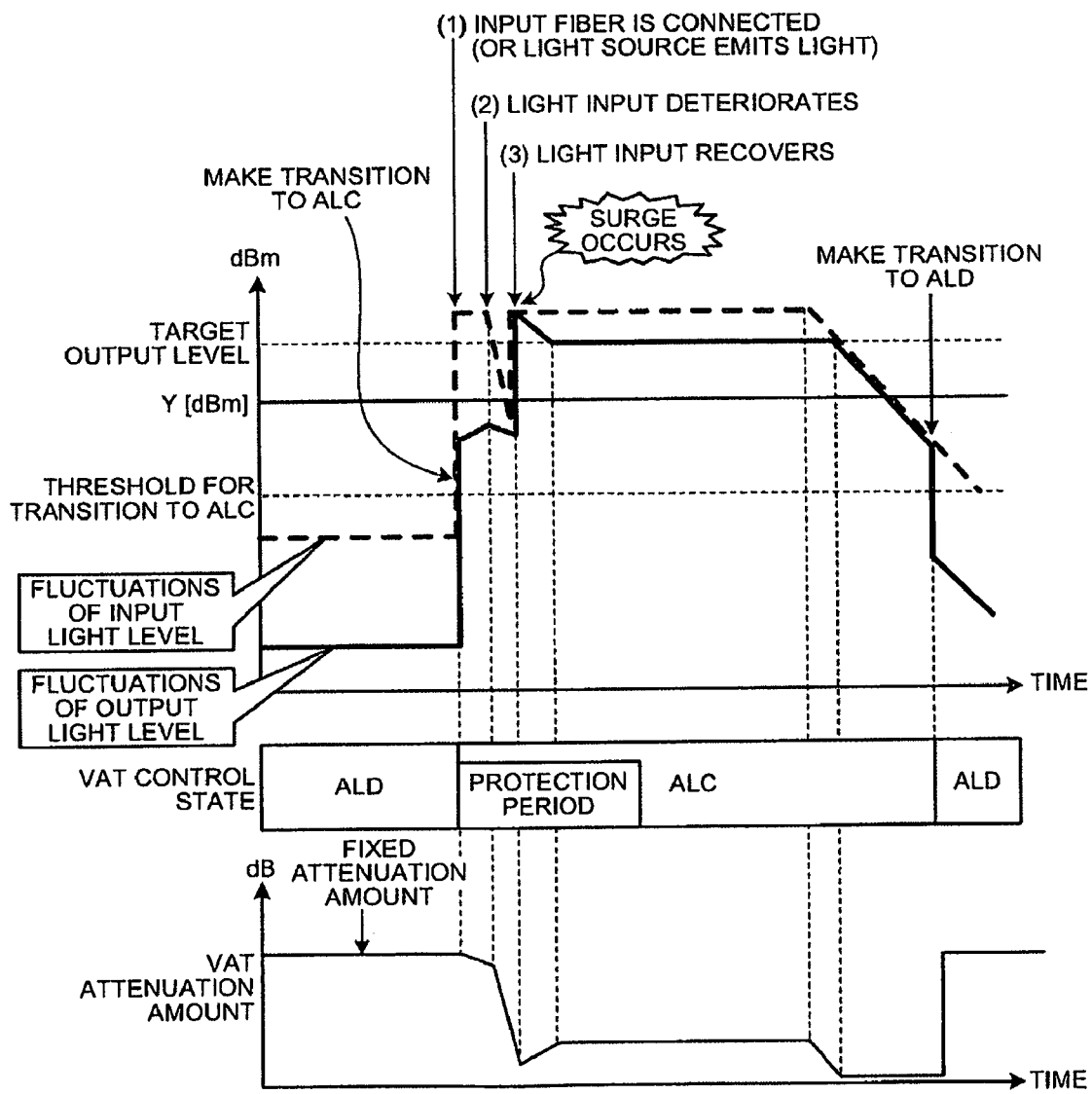

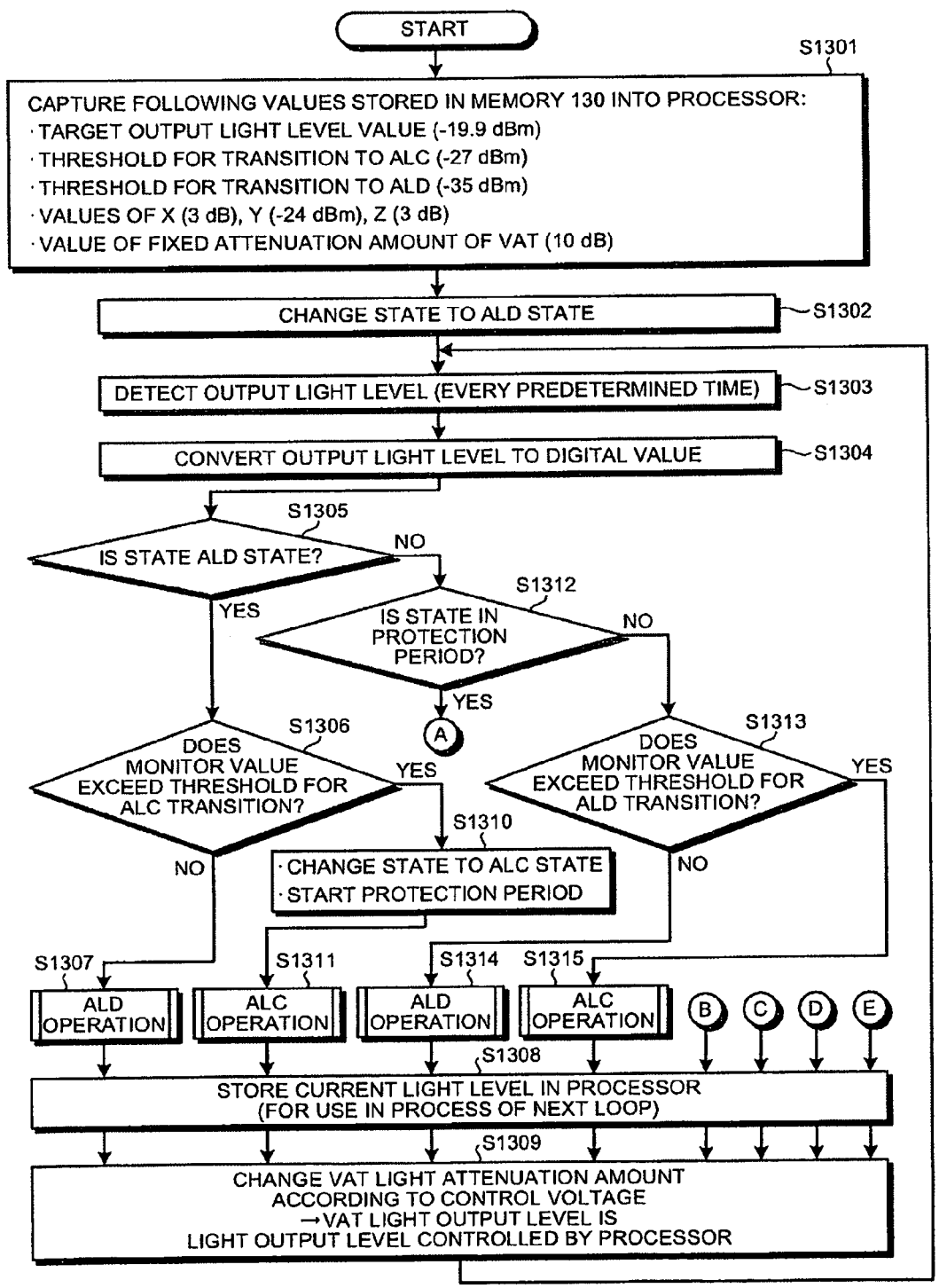

US 8,331,787 B2

OPTICAL TRANSMITTING APPARATUS AND OPTICAL MULTIPLEXING UNIT

CROSS-REFERENCE TO RELATED APPLICATION(S)

This application is based upon and claims the benefit of priority of the prior Japanese Patent Application No. 2008-155942, filed on Jun. 13, 2008, the entire contents of which are incorporated herein by reference.

FIELD

The embodiments discussed herein are directed to an optical transmitting apparatus and an optical multiplexing unit.

BACKGROUND

There is a Wavelength Division Multiplexing (WDM) system that achieves high-speed communications by allowing simultaneous transmission of light of different wavelengths through an optical fiber.

An optical wavelength multiplexing apparatus forming the WDM system above includes a multiplexing/demultiplexing (MUX/DMUX) unit for optical wavelength multiplexing and demultiplexing and an amplifying (AMP) unit for optical amplification according to a transmission distance.

Also, for example, as depicted in FIG. 17, the MUX unit is provided with Variable Attenuator (VAT) control units (for example, $\lambda 1$ to $\lambda 3$) responsible for a light-level changing function for the purpose of equalizing light levels of wavelengths to be multiplexed.

Each VAT control unit has internal states including an ALC state for feedback control of adjusting the value of the optical attenuator so as to decrease a light attenuation amount to increase the output light level to a target value and an ALD state for control of adjusting the value of the optical attenuator so as to keep the light attenuation amount constant to decrease the output light level.

Furthermore, the ALC state is provided with a protection period in which the state does not make a transition to the ALD state, as a grace period for increasing the output light level to some degree after the state makes a transition from the ALD to the ALC state.

With reference to FIG. 18, the output light level and the transition of the internal state in the VAT control unit are explained below. As depicted in the drawing, in the VAT control unit in an ALD state, when a monitor value of the output light level exceeds a threshold for ALC transition, the VAT control unit causes the internal state to make a transition to an ALC state to start a protective-period operation.

Then, as depicted in the drawing, since the internal state is in the protection period of the ALC state, even when the output light level is below a threshold for ALD transition, the VAT control unit does not cause a transition to an ALD state, but performs feedback control of adjusting the value of the optical attenuator so as to decrease the light attenuation amount to increase the output light level to a target value.

Furthermore, as depicted in the drawing, when the internal state goes through the protection period of the ALC state and the monitor value of the output light level is below the threshold for ALD transition, the VAT control unit causes the internal state to make a transition to an ALD state and perform control of adjusting the value of the optical attenuator so as to keep the light attenuation amount constant to decrease the output light level.

As a technology associated with the conventional technology explained above, a method of controlling an optical branching and inserting switch for switching an arbitrary wavelength path at a node in an optical wavelength division multiplexing communication system is disclosed (see Japanese Laid-open Patent Publication No. 2007-67758).

However, the VAT control unit has the following problems. That is, when a light input to a fiber is interrupted due to, for example, withdrawal of the fiber during the protection period of the ALC state, and then the fiber is again inserted (or a fiber is newly added) to recover the light input to the fiber (see (2) and (3) in FIG. 19), the VAT control unit is in an ALC state to continue decreasing the light attenuation amount and, consequently, a surge may occur.

Then, if the surge occurring in the VAT control unit is input to the AMP unit, the wavelength amplification amount of other existing channels is decreased and, consequently, problems arise such that a main-signal error in other channels or a breakdown of an AMP unit of the next node may occur.

SUMMARY

According to an aspect of the invention, an optical transmitting apparatus includes a variable optical attenuator; a determining unit that determines, during a protection period of controlling so as not to perform a state transition even if an output level satisfies a condition for causing the state transition from a first state of controlling so as to gradually increase a level of output light to a second state of controlling so as to attenuate the level of the output light by using an attenuation amount of the variable optical attenuator, whether a level of output light is below a threshold for a state transition from the second state to the first state; and a control unit that controls so as to cause a transition of a state of the variable optical attenuator from the first state to the second state when it is determined by the determining unit that the level of the output light is below the threshold for the state transition to the first state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 6 is a drawing of a correspondence between fluctuation amounts of an output light level and control conditions according to a second embodiment;

FIG. 7 is a drawing of control conditions according to the second embodiment;

FIG. 8 is a drawing of a relation between a fluctuation amount of the output light level and application ranges of the control conditions according to the first embodiment;

FIG. 9 is a drawing of an example of occurrence of a surge when a control condition [C] is not applied, according to the second embodiment;

FIGS. 13A and 13B are drawings of a process flow of a MUX unit according to the second embodiment;

DESCRIPTION OF EMBODIMENT(S)

Preferred embodiments of the present invention will be explained with reference to accompanying drawings.

[Explanation of Terms]

An "ALC state" for use in the following embodiment is one of internal states of a MUX unit of an optical transmitting apparatus (VAT control states). In the ALC state, the VAT attenuation amount for attenuating input light is adjusted to control so as to gradually increase the level of output light.

Also, an "ALD state" is another one of the internal states of the MUX unit of the optical transmitting apparatus, and is different from the ALC state. In the ALD state, the level of output light is controlled so as to be attenuated by using a fixed VAT attenuation amount.

[a] First Embodiment

[General Outline of the Optical Transmitting Apparatus]

Figure 1:
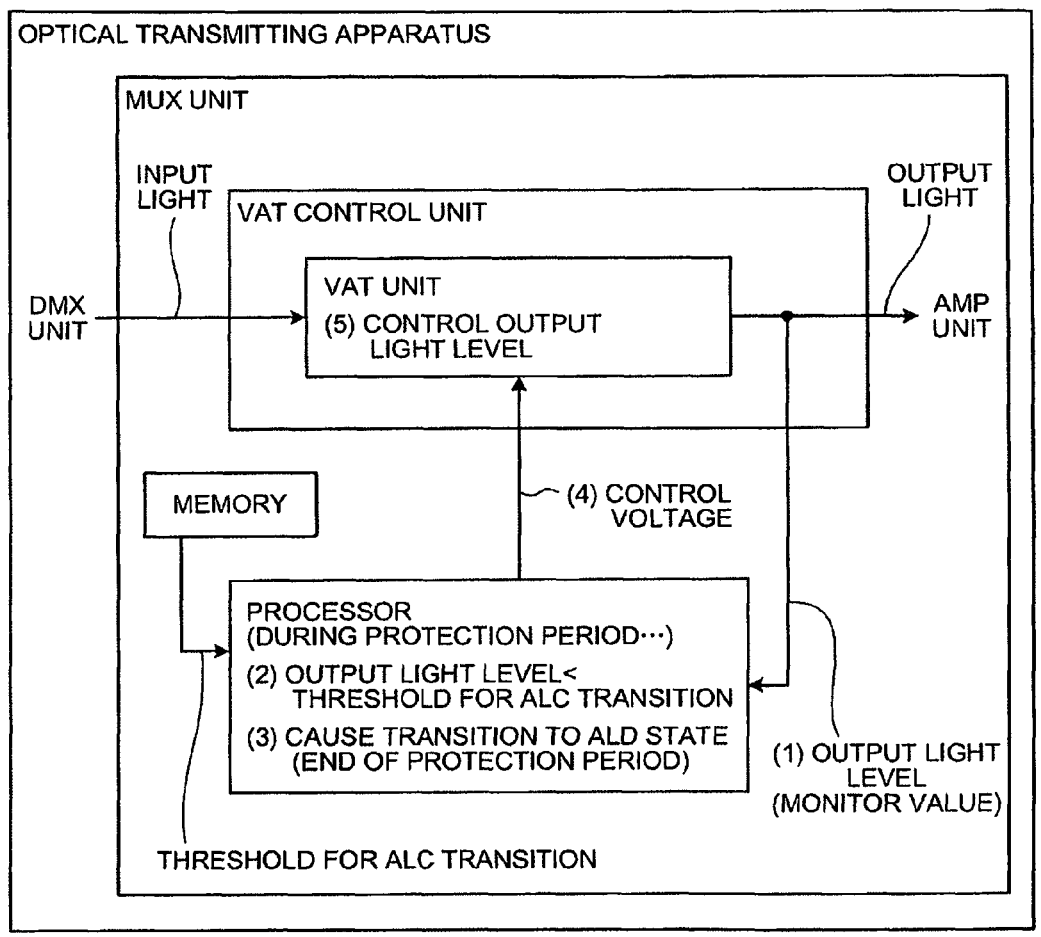
FIG. 1 is a drawing for explaining an optical transmitting apparatus according to a first embodiment.
Figure 2:
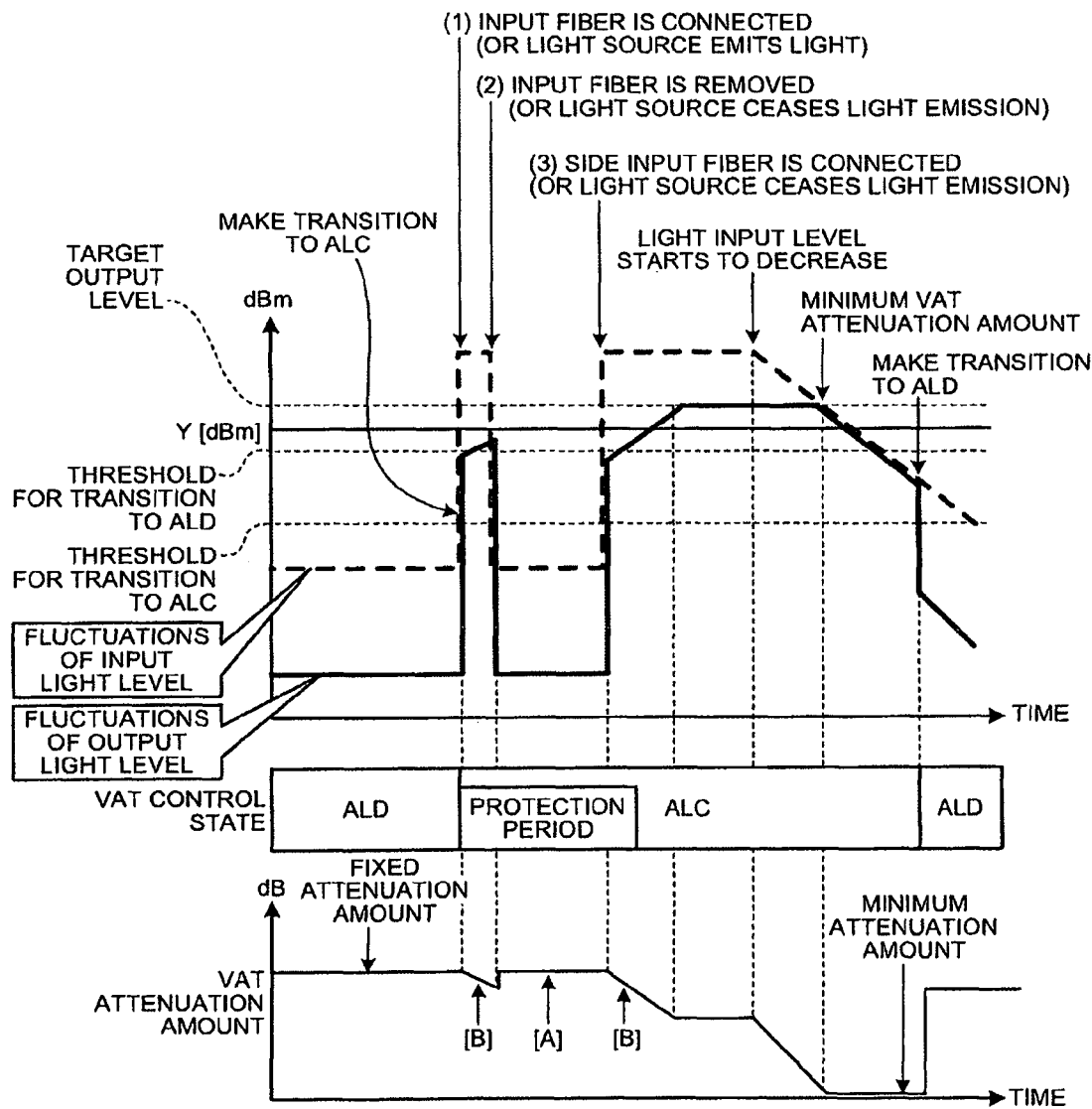
FIG. 2 is a drawing of fluctuations of an input/output light level and state transitions according to the first embodiment.

FIG. 1 is a drawing for explaining an optical transmitting apparatus according to a first embodiment. FIG. 2 is a drawing of fluctuations of an input/output light level and state transitions according to the first embodiment.

The optical transmitting apparatus according to the first embodiment adjusts and multiplexes output levels of respective wavelengths forming input light from another node and then outputs the multiplexed light to still another node.

Also, during a protection period in which a state transition from an ALC state to an ALD state does not occur even when the output level satisfies a condition for causing a state transition from an ALC state to an ALD state (even when the output level is below a threshold for ALD transition), if a predetermined condition is satisfied, the optical transmitting apparatus according to the first embodiment performs control so as to cause a transition from an ALC state to an ALD state, thereby suppressing the occurrence of a surge.

Specifically, as depicted in FIG. 1, in a MUX unit of the optical transmitting apparatus according to the first embodiment, a processor receives an input of a monitor value corresponding to an output light level from a VAT control unit (see (1) in FIG. 1)

Next, the processor determines whether the input output light level (monitor value) is below a threshold for ALC transition read from a memory (see (2) in FIG. 1).

When it is determined that the input output light level is below the threshold for ALC transition read from the memory, the processor switches the internal state from an ALC state to an ALD state for transition, and ends the protection period (see (3) in FIG. 1).

Then, the processor starts an ALD operation, and outputs a control voltage achieving a predetermined fixed attenuation amount to the VAT control unit (see (4) in FIG. 1).

According to the control voltage input from the processor, the VAT control unit makes an adjustment by changing a VAT attenuation amount, and controls the output light level with the adjusted VAT attenuation amount (see (5) in FIG. 1).

With reference to FIG. 2, fluctuations of input and output light levels and transitions of the internal state are explained. As depicted in the drawing, the MUX unit makes a transition to an ALC state due to, for example, a connection of a fiber (see (1)), and at the same time, a protection period starts.

With the transition to an ALC state, the output light level gradually increases. Here, upon withdrawal of the fiber (see (2) in FIG. 2), for example, the input light level abruptly decreases, and the output light level also decreases accordingly.

Normally, when the output light level is below the threshold for ALD transition, the MUX unit makes a transition to an ALD state and performs control so as to attenuate the output light level with a predetermined fixed attenuation amount.

However, as explained in the Related Art section, since the internal state is in the protection period of the ALC state, the MUX unit continues decreasing the VAT attenuation amount without making a transition to an ALD state.

As a result, when the input light level abruptly increases due to, for example, a reconnection of the fiber (or an addition of a new fiber) (see (3) in FIG. 2), a surge may occur.

To get around this, when the output light level is below the threshold for ALC transition, the MUX unit causes the internal state to make a transition from the ALC state to an ALD state to end the protection period.

Then, the MUX unit starts an ALD operation, making an adjustment by changing the VAT attenuation amount to a predetermined fixed attenuation amount (see [A] in FIG. 2) and controlling the output light level with the adjusted VAT attenuation amount.

Then, even if the input light level abruptly increases due to a reconnection of the fiber or the like, the output light level does not abruptly increase to exceed a target output level, thereby suppressing the occurrence of a surge.

With this, the optical transmitting apparatus according to the first embodiment performs control of causing a transition to an ALD state when a predetermined condition is satisfied even during the protection period, thereby suppressing the occurrence of a surge.

[Configuration of the Optical Transmitting Apparatus]

Figure 3:
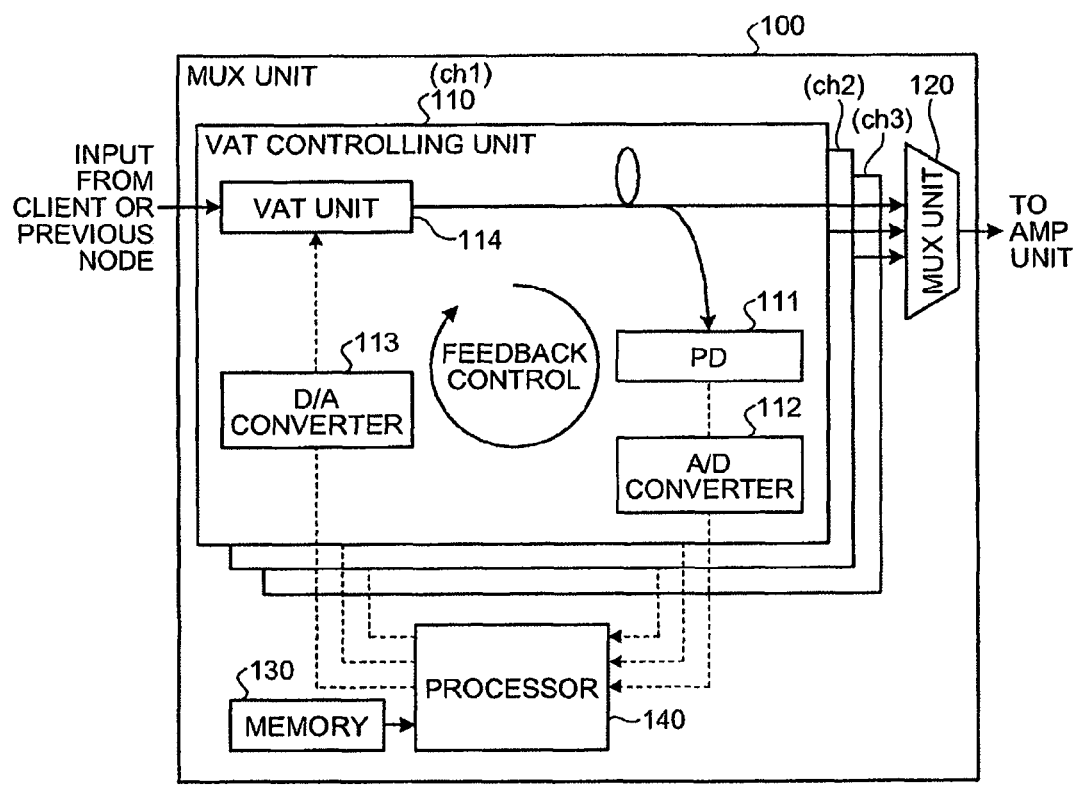
FIG. 3 is a drawing of the configuration of a MUX unit according to the first embodiment.
Figure 4:
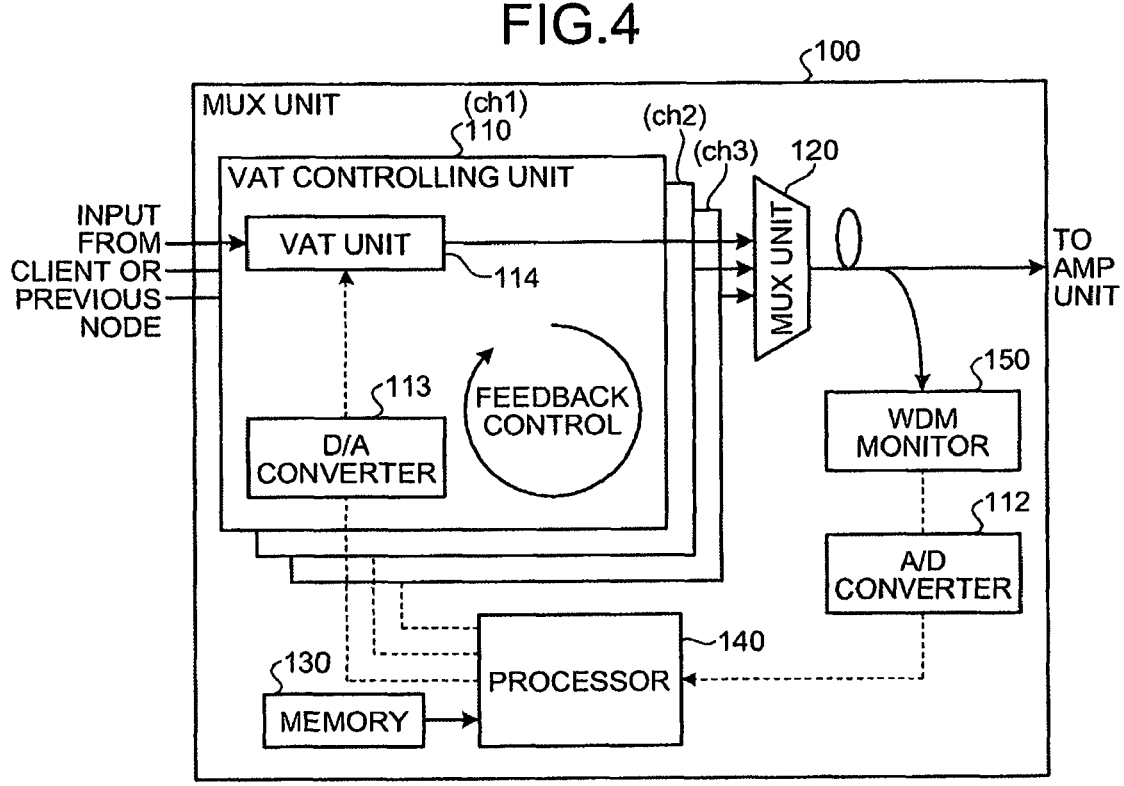
FIG. 4 is a drawing of the configuration of the MUX unit according to the first embodiment.

FIGS. 3 and 4 are drawings of the configuration of the MUX unit according to the first embodiment. Note that only the portions related to the optical transmitting apparatus according to the first embodiment are depicted in FIGS. 3 and 4.

As depicted in FIG. 3, a MUX unit 100 of the optical transmitting apparatus according to the first embodiment includes a plurality of VAT control units 110 (ch1 to ch3), a MUX unit 120, a memory 130, and a processor 140.

Each of the VAT control units 110 is a control unit responsible for a light-level changing function for the purpose of equalizing light levels of wavelengths to be multiplexed. As depicted in FIG. 3, the VAT control unit 110 includes a Photo Detector (PD) 111, an analog/digital (A/D) converter 112, a digital/analog (D/A) converter 113, and a VAT unit 114.

The PD 111 is a photo detecting element that outputs a voltage proportional to the light amount incident to a light-receiving surface. Every predetermined time set in advance, the PD 111 detects output light from the VAT unit 114, and outputs a voltage corresponding to the detected output light level to the A/D converter 112.

The A/D converter 112 is a converter that converts analog data to digital data. Every time the voltage corresponding to the output light level is input from the PD 111, the A/D converter 112 converts the voltage to a digital value (monitor value) for output to the processor 140.

The D/A converter 113 is a converter that converts digital data to analog data. Every time the control voltage value is input from the processor 140, the D/A converter 113 converts the control voltage value to a control voltage for output to the VAT unit 114.

The VAT unit 114 is a processing unit that controls the output light level by adjusting the value of the optical attenuator (VAT attenuation amount). Every time the control voltage is input from the D/A converter 113, the VAT unit 114 adjusts the VAT attenuation amount according to the control voltage, thereby controlling the output light level.

The MUX unit 120 is an optical multiplexer that multiplexes output lights of wavelengths input from the VAT control unit 110 for output to an AMP unit of the following stage.

The memory 130 is a storage unit that stores various parameters for use in processing by the processor 140, which will be explained further below, having stored therein a target value of the output light level (target level value), a threshold for transition to ALC, a threshold for transition to ALD, a fixed attenuation amount at ALD, and others.

The processor 140 is a processor that controls switching of the internal state of the MUX unit 100.

During a protection period in which a state transition from an ALC state to an ALD state does not occur even when the output level satisfies a condition for causing a state transition from an ALC state to an ALD state (even when the output level is below the threshold for ALD transition), if a predetermined condition is satisfied, the processor 140 causes a transition from an ALC state to an ALD state, thereby controlling adjustment of the VAT attenuation amount (VAT control).

Specifically, the processor 140 reads, from the memory 130 at the time of starting the MUX unit 100, the target value of the output light level (target level value), the threshold for transition to ALC, the threshold for transition to ALD, the fixed attenuation amount at ALD, and others.

Then, when a digital value corresponding to the output light level (monitor value) is input from the A/D converter 112, the processor 140 determines whether the input output light level (monitor value) is below the threshold for ALC transition read from the memory 130.

When it is determined that the input output light level (monitor value) is below the threshold for ALC transition read from the memory, the processor 140 causes the internal state to be switched from the ALC state to an ALD state for transition, and ends the protection period.

Then, the processor 140 starts an ALD operation, and outputs a control voltage value achieving the fixed attenuation amount read from the memory 130 to the D/A converter 113.

When it is determined that the input output light level (monitor value) is not below the threshold for ALC transition read from the memory, the processor 140 compares the current output light level and the target output level value with each other, calculates a control voltage value achieving an attenuation amount so that the output light level is near the target value, and then outputs the control voltage value to the D/A converter 113.

When the internal state is in the protection period of the ALC state, every time a digital value (monitor value) corresponding to the output light level is input from the A/D converter 112, the processor 140 repeats the process above.

Note that the configuration of the MUX unit 100 is not meant to be restricted to that depicted in FIG. 3. That is, as depicted in FIG. 4, in place of the VAT unit 114 included in the VAT control unit 110, a component achieved by applying Micro-Electro-Mechanical Systems (MEMS) may be used.

Furthermore, as depicted in FIG. 4, in place of the PD 111, a WDM monitor 150 may be disposed outside of the VAT control unit 110 to detect a output light level output from the MUX unit 120 for each wavelength and output a monitor value corresponding to the output light level to the processor 140 via the A/D converter 112 disposed outside of the VAT control unit 110.

[Process of the Optical Transmitting System]

Figure 5:
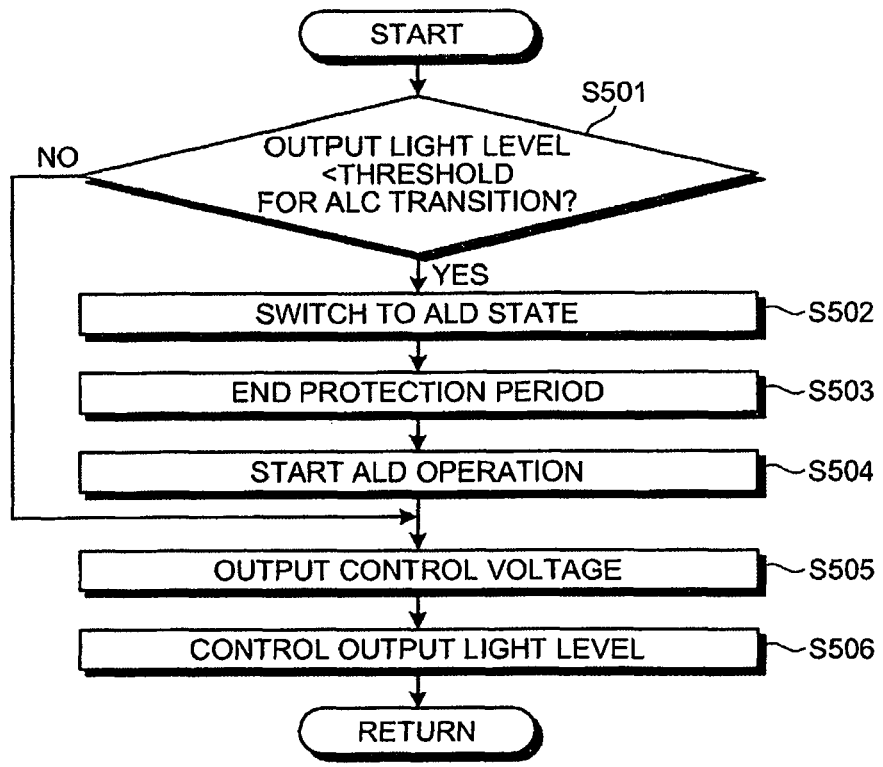
FIG. 5 is a drawing of a process flow of the MUX unit according to the first embodiment.

FIG. 5 is a drawing of a process flow of the MUX unit according to the first embodiment. Note that the process flow of the MUX unit depicted in FIG. 5 is in a protection period.

As depicted in the drawing, when a digital value (monitor value) corresponding to the output light level is input from the A/D converter 112, the processor 140 determines whether the input output light level (monitor value) is below the threshold for ALC transition read from the memory 130 (step S501).

When it is determined that the input output light level (monitor value) is below the threshold for ALC transition read from the memory ("Yes" at step S501), the processor 140 switches the internal state from the ALC state to an ALD state for transition (step S502), and ends the protection period (step S503).

Then, the processor 140 starts an ALD operation (step S504), and outputs a control voltage achieving the fixed attenuation amount read from the memory 130 to the D/A converter 113 (step S505).

When the control voltage is input via the D/A converter 113, the VAT control unit 110 adjusts the VAT attenuation amount according to the control voltage, thereby controlling the output light level (step S506).

When the input output light level (monitor value) is not below the threshold for ALC transition read from the memory ("No" at step S501), the processor 140 compares the current output light level and the target output level value each other, calculates a control voltage value achieving a VAT attenuation amount so that the output light level is near the target value, and then outputs the control voltage value to the D/A converter 113 (step S505).

[Effects of the First Embodiment]

As has been explained above, according to the first embodiment, when a predetermined condition is satisfied even during the protection period, the internal state is controlled to make a transition to an ALD state. With this, an effect of suppressing the occurrence of a surge due to, for example, an insertion or addition of a fiber, and preventing a main-signal error and a device breakdown due to the occurrence of surge can be achieved.

[b] Second Embodiment

In the following, another embodiment of the optical transmitting apparatus is explained.

An optical transmitting apparatus according to a second embodiment is different from the optical transmitting apparatus according to the first embodiment in the following points.

The memory 130 has stored therein parameter values (X (for example, 3 dB) for comparison with a fluctuation amount of the output light level and Y (for example, −24 dB) for comparison with the output light level) for use in control conditions C and D, which will be explained further below, in addition to the target value of the output light level (target level value), the threshold for transition to ALC, the threshold for transition to ALD, and the fixed attenuation amount at ALD.

When a digital value (monitor value) corresponding to the output light level is input from the A/D converter 112, the processor 140 (for example, see FIG. 3) stores therein the current output light level input from the A/D converter 112.

Next, the processor 140 calculates a difference between the previously-input output light level (monitor value) and the currently-input output light level to find a fluctuation amount of the output light level.

Then, the processor 140 uses various parameters read from the memory 130 to determine whether the currently-input output light level and the fluctuation amount from the previously-input output light level are within any application range of each control condition, which will be explained further below, and, according to the determination result, further determines an operation for VAT control.

FIG. 6 is a drawing of a correspondence between fluctuation amounts of the output light level and control conditions according to the second embodiment. FIG. 7 is a drawing of control conditions according to the second embodiment. FIG. 8 is a drawing of a relation between fluctuation amounts of the output light level and application ranges of the control conditions according to the second embodiment.

For example, in FIG. 6, in association with each control time (t1 to t7) in the protection period, a correspondence among fluctuation amounts (d1 to d7) of the output light level, control conditions ([A] to [D]), and operations for VAT control is depicted.

Here, the fluctuation amount of the output light level represents a difference in output level between the previous time (for example, t1) and the current time (for example, t2).

Also, as depicted in FIG. 7, among the control conditions, a control condition A is to cause a transition to an ALD state when a condition that the current output level is below the threshold for ALC transition is satisfied. This control condition A is similar to a condition for use by the processor 140 in the first embodiment in switching the internal state.

Furthermore, as depicted in the drawing, a control condition B is, when a condition that the fluctuation amount is smaller than X (for example, 3 dB) is satisfied, as conventional (in a manner similar to the normal operation), to compare the current output light level and the target output level value and calculate a control voltage value achieving a VAT attenuation amount (feedback amount) so that the output light level is near the target level.

Still further, as depicted in the drawing, a control condition C is to unchange the current VAT attenuation amount (to make a feedback amount 0) when a condition that the fluctuation amount is greater than X (for example, 3 dB) and the current output level is equal to or smaller than Y (for example, −24 dB) is satisfied.

Still further, as depicted in the drawing, a control condition D is to increase the VAT attenuation amount when a condition that the fluctuation amount is greater than X (for example, 3 dB) and the current output level is greater than Y (for example, −24 dB) is satisfied.

FIG. 8 clearly depicts the relation between the fluctuation amount of the output light level and the application ranges of the control conditions during the protection period. For example, when the fluctuation amount of the output light level is d1 and d4 (see (1) in FIG. 8), the control condition B applies, from among the control conditions depicted in FIG. 7 and according to the correspondence depicted in FIG. 6.

Similarly, when the fluctuation amount of the output light level is d2 (see (2) in FIG. 8), the control condition C applies. When the fluctuation amount of the output light level is d3, d5, and d6 (see (3) in FIG. 8), the control condition D applies. When the fluctuation amount of the output light level is d7 (see (4) in FIG. 8), the control condition A applies.

As explained above, the processor 140 determines which of the control conditions A to D corresponds to the currently-input output light level and the fluctuation amount of the output light level and, according to the determination result, further determines an operation for VAT control.

FIG. 9 is a drawing of an example of occurrence of a surge when the control condition [C] is not applied, according to the second embodiment. After the state makes a transition to an ALC state to start a protection period, as the light input to the fiber deteriorates (see (2) in the drawing), the VAT attenuation amount abruptly decreases due to VAT control by the processor 140 when the control condition C is not applied.

Under the circumstances, when the light input to the fiber recovers, since the VAT attenuation amount has decreased, the output light level abruptly increases to cause a surge.

Figure 10:
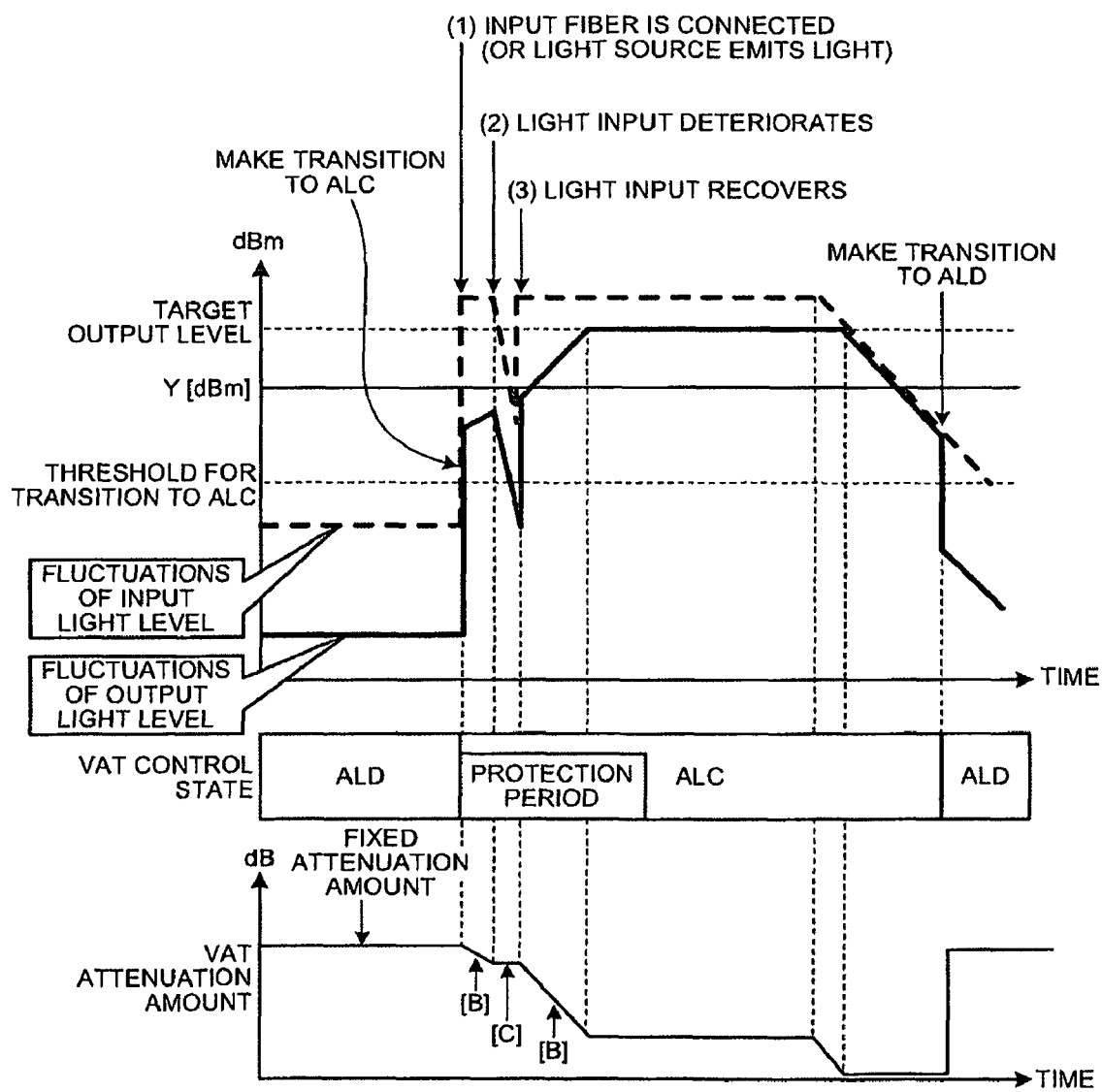
FIG. 10 is a drawing of fluctuations and state transitions of the input/output light level when the control condition [C] is applied, according to the second embodiment.

To get around this, the control condition C is applied. With this, when the fluctuation amount is greater than X (for example, 3 dB) and the current output level is equal to or smaller than Y (for example, −24 dB), the processor 140 does not change the current VAT attenuation amount (see [C] in FIG. 10).

As a result, an abrupt increase in output light level can be prevented, thereby suppressing the occurrence of a surge.

Figure 11:
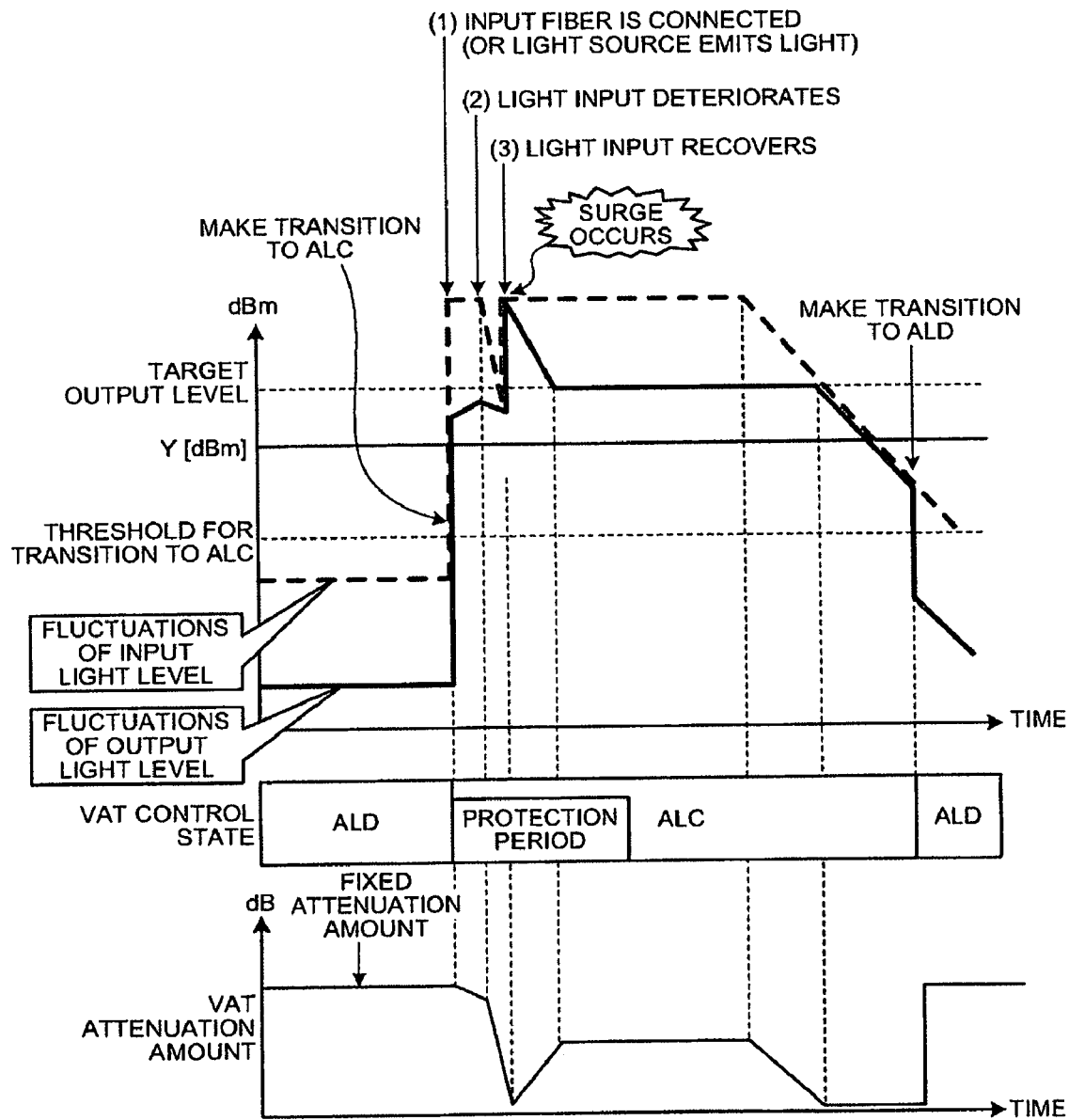
FIG. 11 is a drawing of an example of occurrence of a surge when a control condition [D] is not applied, according to the second embodiment.

FIG. 11 is a drawing of an example of occurrence of a surge when a control condition [D] is not applied, according to the second embodiment. As with the case depicted in FIG. 9, when the control condition D is not applied, the VAT attenuation amount has decreased, and therefore the output light level abruptly increases to cause a surge.

Figure 12:
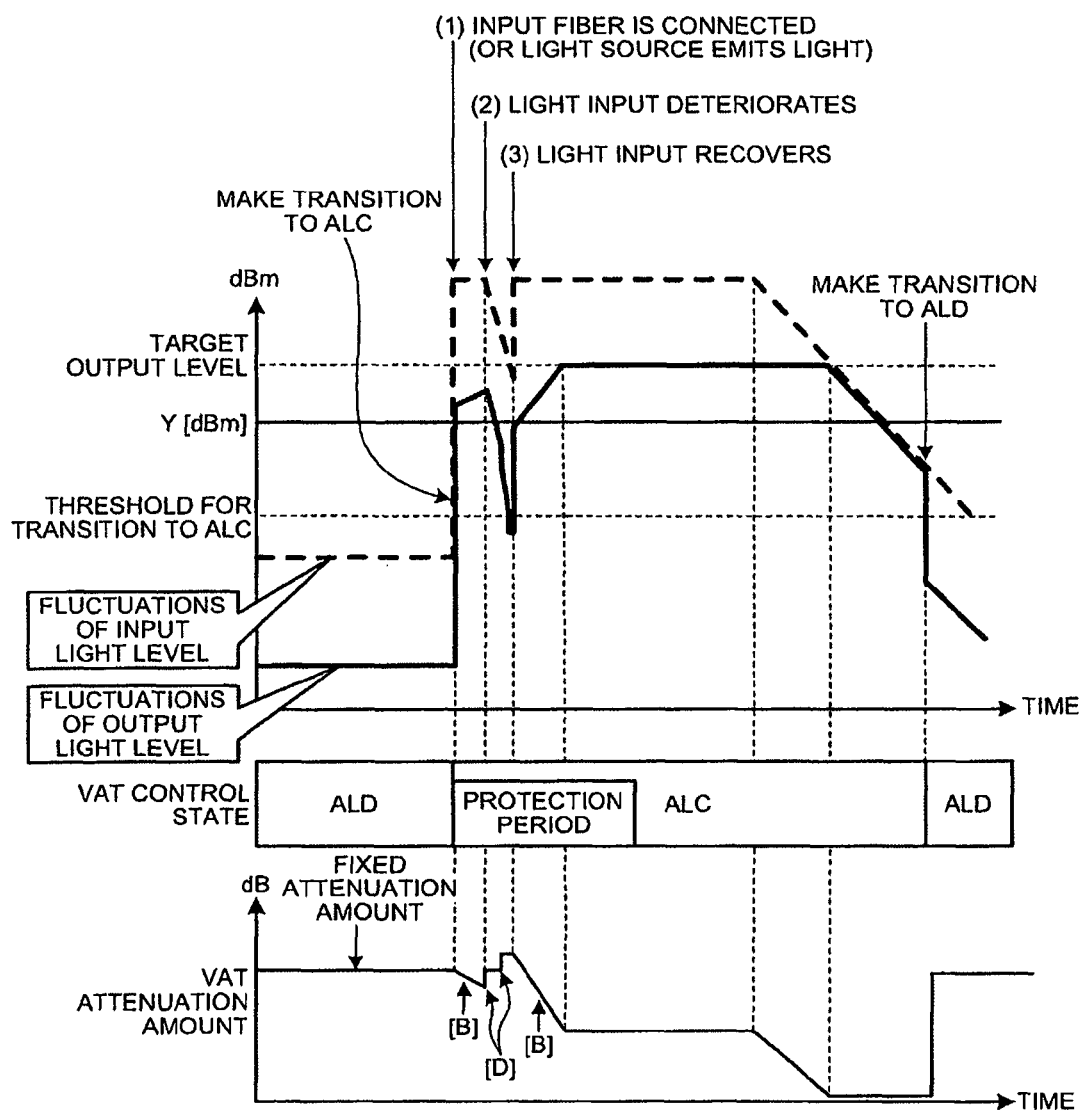
FIG. 12 is a drawing of fluctuations and state transitions of the input/output light level when the control condition [D] is applied, according to the second embodiment.

To get around this, the control condition D is applied. With this, when the fluctuation amount is greater than X (for example, 3 dB) and the current output level is greater than Y (for example, −24 dB), the processor 140 increases the current VAT attenuation amount (see [D] in FIG. 12).

Note that, with the control conditions C and D, a decrease in VAT attenuation amount can be prevented not only when light input ceases due to withdrawal of the fiber or the like but also when light input weakens due to deterioration in light input or the like, thereby suppressing the occurrence of a small surge.

[Process by the Optical Transmitting Apparatus]

Figure 13B:
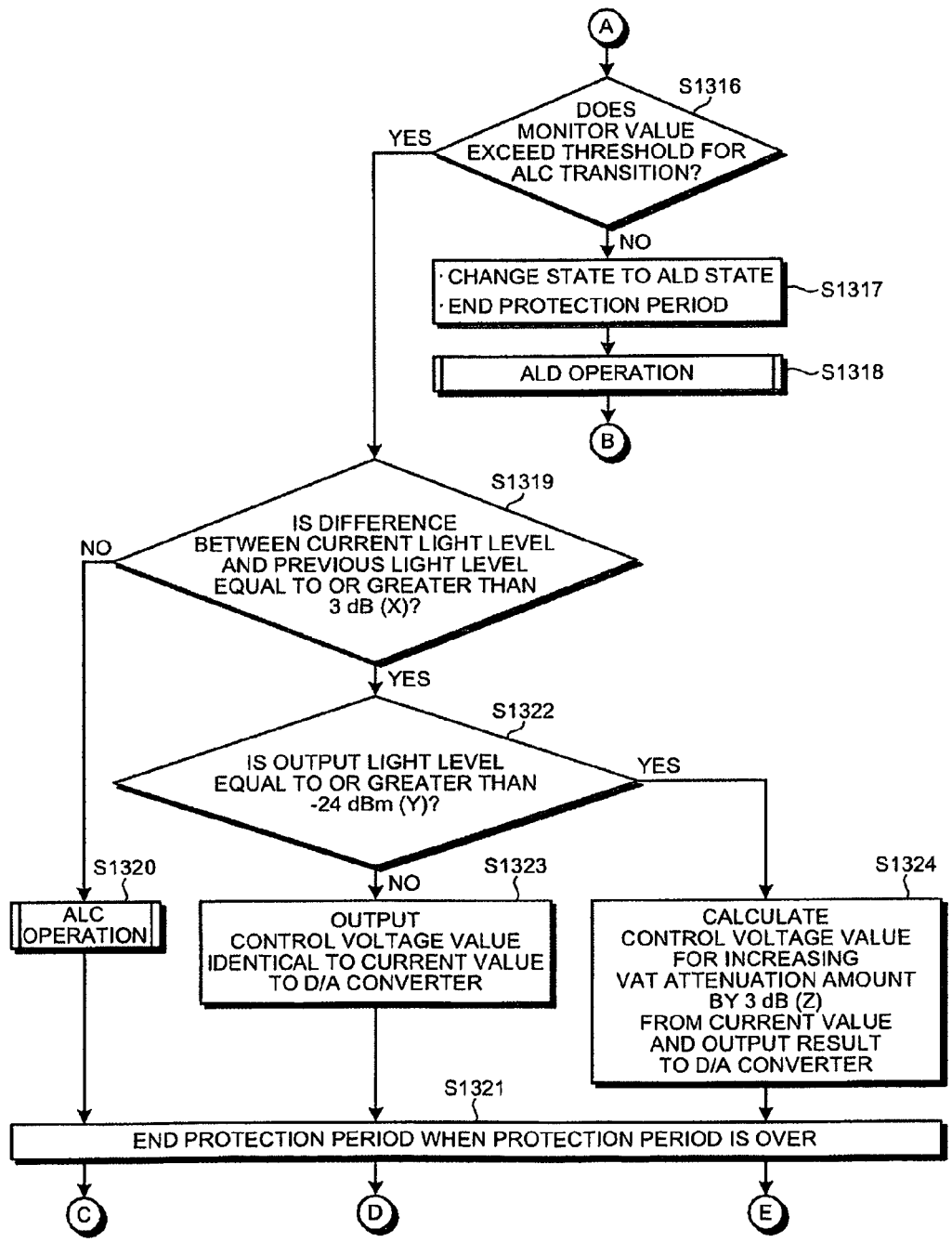

FIGS. 13A and 13B are drawings of a process flow of the MUX unit according to the second embodiment. In FIGS. 13A and 13B, an overall process flow of the MUX unit including processes other than those in the protection period is depicted.

As depicted in the drawing, the processor 140 reads each of the parameters stored in the memory 130 (the target level value, the threshold for transition to ALC, the threshold for transition to ALD, X, Y, and the fixed attenuation amount) (step S1301).

Next, the processor 140 changes the internal state to an ALD state (step S1302). The PD 111 then detects a light level (output light level) every predetermined time (step S1303).

Every time a voltage corresponding to the output light level is input from the PD 111, the A/D converter 112 converts the voltage to a digital value (monitor value) (step S1304).

When the digital value (monitor value) corresponding to the output light level is input from the A/D converter 112, the processor 140 checks to see whether the internal state is an ALD state (step S1305).

When it is determined as a result of the check that the internal state is an ALD state ("Yes" at step S1305), the processor 140 determines whether the output light level (monitor value) that is input exceeds (is above) the threshold for transition to ALC read from the memory 130 (step S1306).

When it is determined that the output light level (monitor value) that is input does not exceed (is below) the threshold for transition to ALC read from the memory 130 ("No" at step S1306), the processor 140 continues the ALD operation (step S1307), which will be explained further below, and then stores therein the current output light level (step S1308).

When a control voltage is input via the D/A converter 113 from the processor 140, the VAT control unit 110 adjusts the VAT attenuation amount according to the control voltage (step S1309).

On the other hand, when the output light level (monitor value) that is input exceeds (is above) the threshold for transition to ALC read from the memory 130 ("Yes" at step S1306), the processor 140 causes the internal state to make a transition to an ALC state to start a protection period and an ALC operation (steps S1310 and S1311), which will be explained further below.

Then, the procedure goes to steps S1308 and S1309 explained above.

Here, referring back to step S1305, when it is determined as the result of the check that the internal state is not an ALD state ("No" at step S1305), the processor 140 checks to see whether the state is in a protection period (step S1312).

When it is determined that the state is not in a protection period ("No" at step S1312), the processor 140 determines whether the output light level (monitor value) that is input exceeds (is above) the threshold for transition to ALD read from the memory 130 (step S1313).

When it is determined that the output light level (monitor value) that is input does not exceed (is below) the threshold for transition to ALD read from the memory 130 ("No" at step S1313), the processor 140 causes the internal state to make a transition to an ALD state to start an ALD operation (step S1314).

Then, the procedure goes to steps S1308 and S1309 explained above.

On the other hand, when it is determined that the output light level (monitor value) that is input exceeds (is above) the threshold for transition to ALD read from the memory 130 ("Yes" at step S1313), the processor 140 continues the ALC operation as it is (step S1315).

Then, the procedure goes to steps S1308 and S1309 explained above.

When it is determined that the state is in the protection period ("Yes" at step S1312), the processor 140 determines whether the output light level (monitor value) that is input exceeds (is above) the threshold for transition to ALC read from the memory 130 (step S1316).

When it is determined that the output light level (monitor value) that is input does not exceed (is below) the threshold for transition to ALC read from the memory 130 ("No" at step S1316), the processor 140 determines that the state matches the control condition A, causing the internal state to make a transition to an ALD state to end the protection period (step S1317) and start an ALD operation (step S1318), which will be explained further below.

Then, the procedure goes to steps S1308 and S1309 explained above.

On the other hand, when it is determined that the output light level (monitor value) that is input exceeds (is above) the threshold for transition to ALC read from the memory 130 ("Yes" at step S1316), the processor 140 then determines whether a difference (fluctuation amount) between the current output light level and the previously-input output light level is equal to or greater than X (3 dB) (step S1319).

When it is determined that the difference (fluctuation amount) between the current output light level and the previously-input output light level is not equal to or greater than 3 dB (X) ("No" at step S1319), the processor 140 determines that the state matches the control condition B, continuing the ALC operation (step S1320).

Furthermore, if the current time has passed over the protection period, the processor 140 ends the protection period (step S1321).

Then, the procedure goes to steps S1308 and S1309 explained above.

On the other hand, when it is determined that the difference (fluctuation amount) between the current output light level and the previously-input output light level is equal to or greater than 3 dB (X) ("Yes" at step S1319), the processor 140 further determines whether the current light output level is equal to or greater than −24 dB (step S1322).

When it is determined that the current light output level is smaller than −24 dB ("No" at step S1322), the processor 140 determines that the state matches the control condition C, outputting the current control voltage value (feedback amount is 0) to the D/A converter 113 (step S1323).

Then, the procedure goes to steps S1321, S1308, and S1309 explained above.

On the other hand, when it is determined that the current light output level is equal to or greater than −24 dB ("Yes" at step S1322), the processor 140 determines that the state matches the control condition D, calculating a control voltage value so that the VAT attenuation amount is increased by 3 dB and outputting the calculated value to the D/A converter 113 (step S1324).

Then, the procedure goes to steps S1321, S1308, and S1309 explained above.

Figure 14:
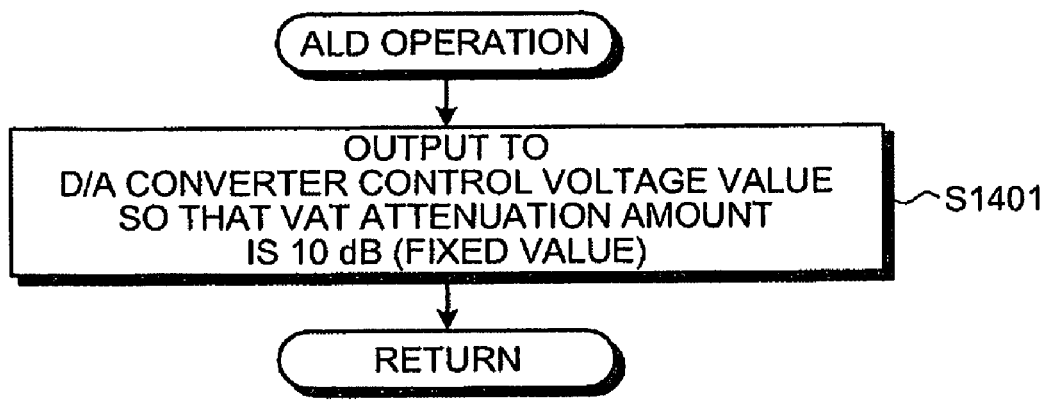
FIG. 14 is a drawing of a flow of an ALD operation.

FIG. 14 is a drawing of a flow of an ALD operation. As depicted in the drawing, every time the output light level (monitor value) is input from the A/D converter 112, the processor 140 repeatedly outputs to the D/A converter 113 a control voltage value so that the VAT attenuation amount is 10 dB (fixed value) during an ALD operation (step S1401).

Figure 15:
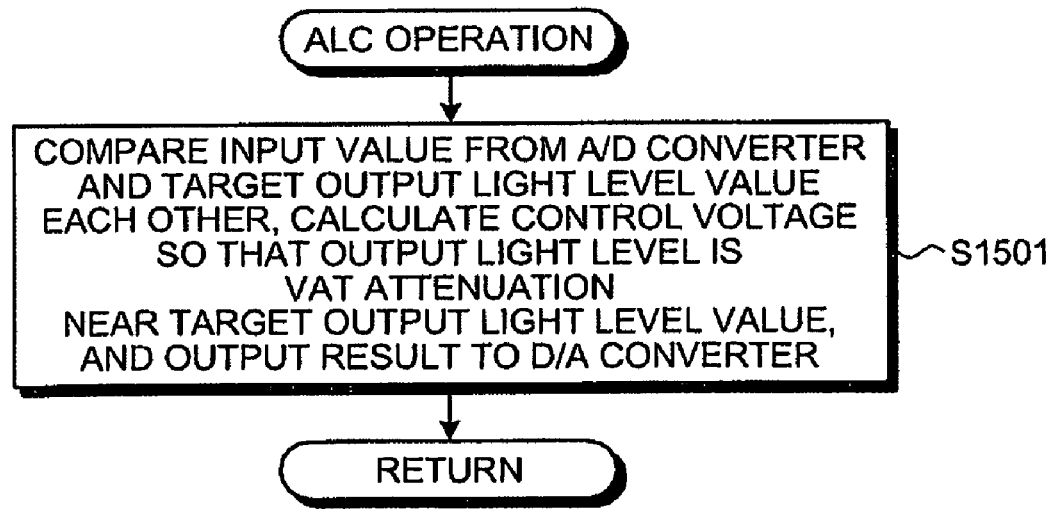
FIG. 15 is a drawing of a flow of an ALC operation.

FIG. 15 is a drawing of a flow of an ALC operation. As depicted in the drawing, every time the output light level is input from the A/D converter 112, the processor 140 operates as follows during an ADC operation.

That is, the processor 140 compares the output light level (input (monitor) value) input from the A/D converter 112 and the target output light level value read from the memory 130 in advance each other, calculates a control voltage value achieving a VAT attenuation value so that the output light level is near the target output light level, and then repeatedly outputs the control voltage value to the D/A converter 113 (step S1501).

[Effects of the Second Embodiment]

As has been explained above, according to the second embodiment, during the protection period, a decrease in VAT attenuation amount can be prevented not only when light input ceases due to withdrawal of the fiber or the like but also when light input weakens due to deterioration in light input or the like, thereby suppressing the occurrence of a small surge.

[c] Third Embodiment

The following embodiment is further disclosed.

(1) Apparatus Configuration and Others

Each component of the MUX unit 100 of the optical transmitting apparatus depicted in FIGS. 3 and 4 is conceptual in function, and is not necessarily physically configured as depicted.

That is, the specific patterns of distribution and unification of the MUX unit 100 of the optical transmitting apparatus are not meant to be restricted to those depicted in FIG. 3 or 4. For example, the memory 130 and the processor 140 are placed for each channel of the VAT control unit 110 (for example, ch1 to ch3). As such, all or part of the components can be functionally or physically distributed or unified in arbitrary units according to various loads and the state of use.

Furthermore, all or arbitrary part of the process functions performed in the MUX unit 100 of the optical transmitting apparatus (see FIG. 5 or 13) can be achieved by a Central Processing Unit (CPU) and a program analyzed and executed on that CPU, or can be achieved as hardware with a wired logic.

(2) Optical Multiplexing Program

Also, each process function performed in the MUX unit 100 explained in the embodiments (see FIG. 5 or 13) can be achieved by a program provided in advance being executed on a computer system, such as a personal computer or a work station.

Figure 16:
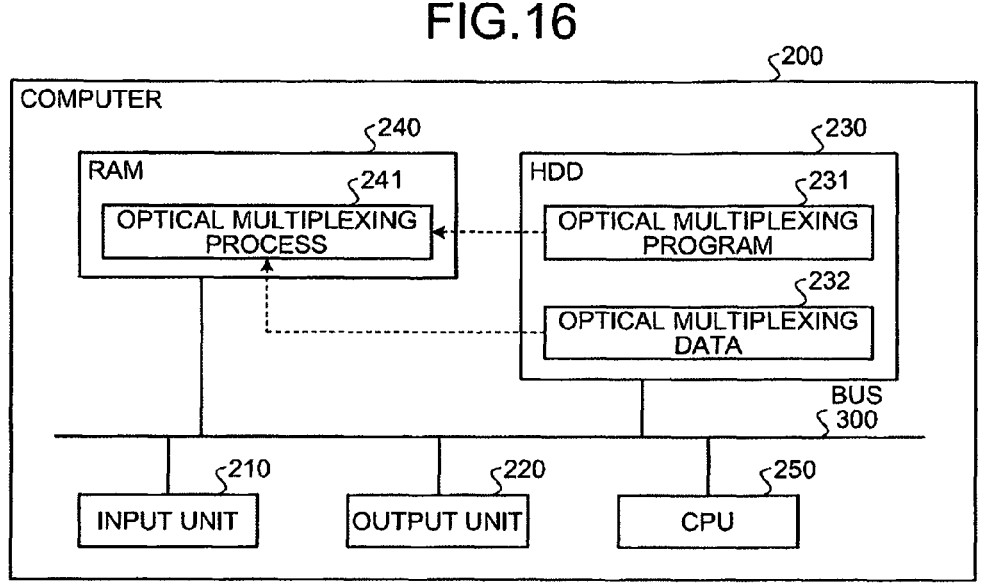
FIG. 16 is a drawing of a computer executing an optical multiplexing program.
Figure 17:
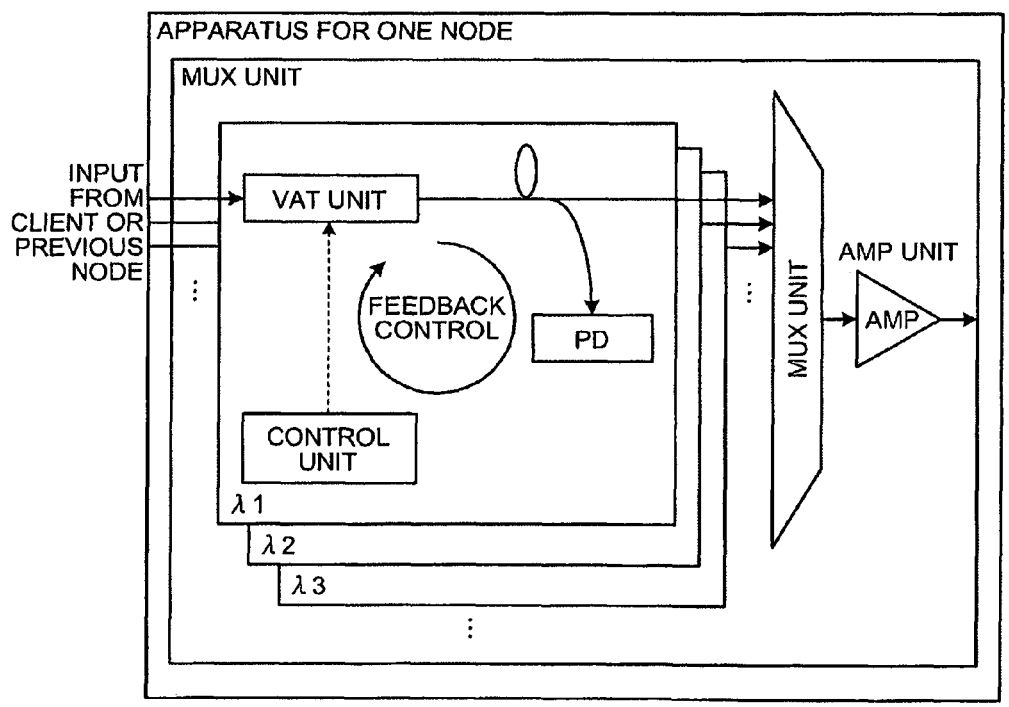
FIG. 17 is a drawing for explaining a conventional technology.
Figure 18:
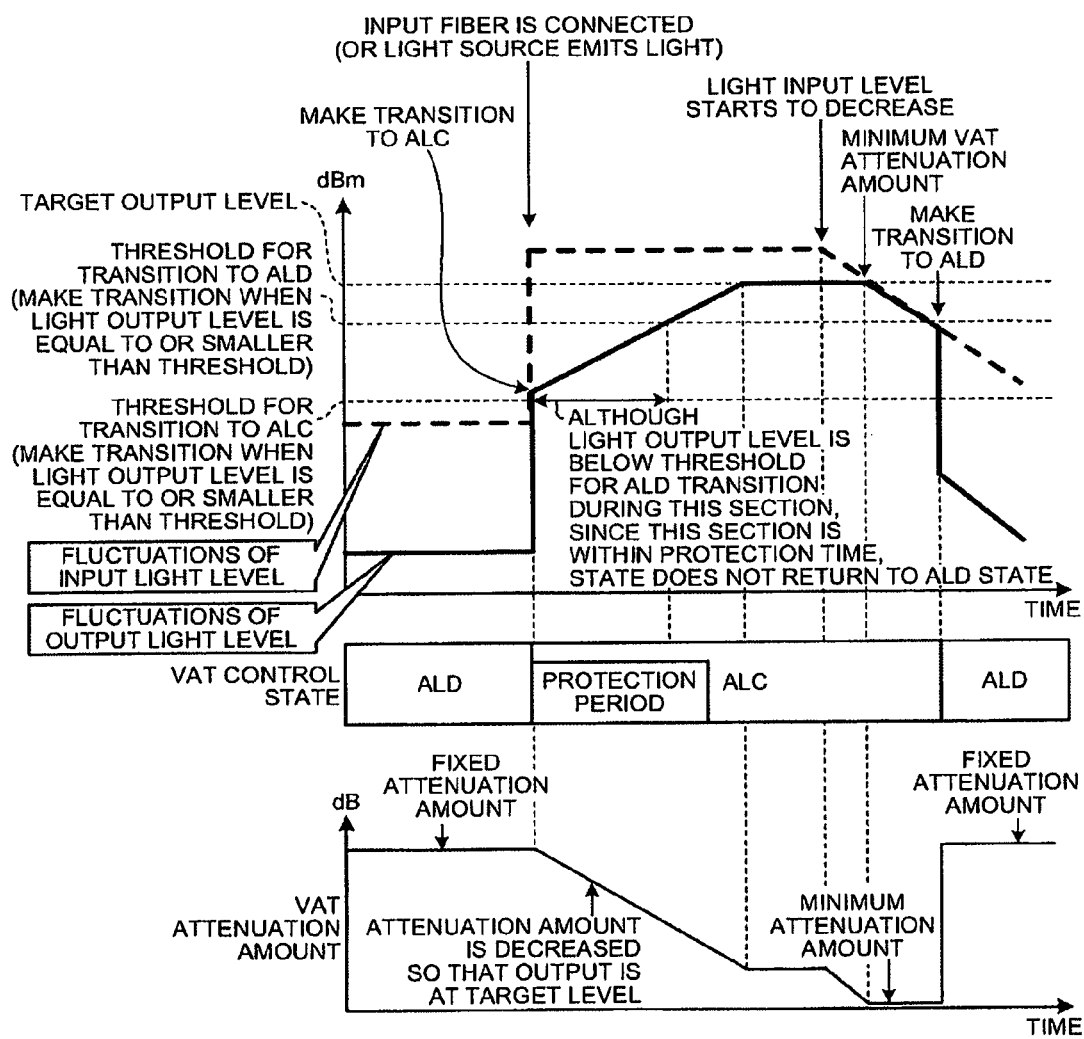
FIG. 18 is a drawing for explaining a conventional technology.
Figure 19:
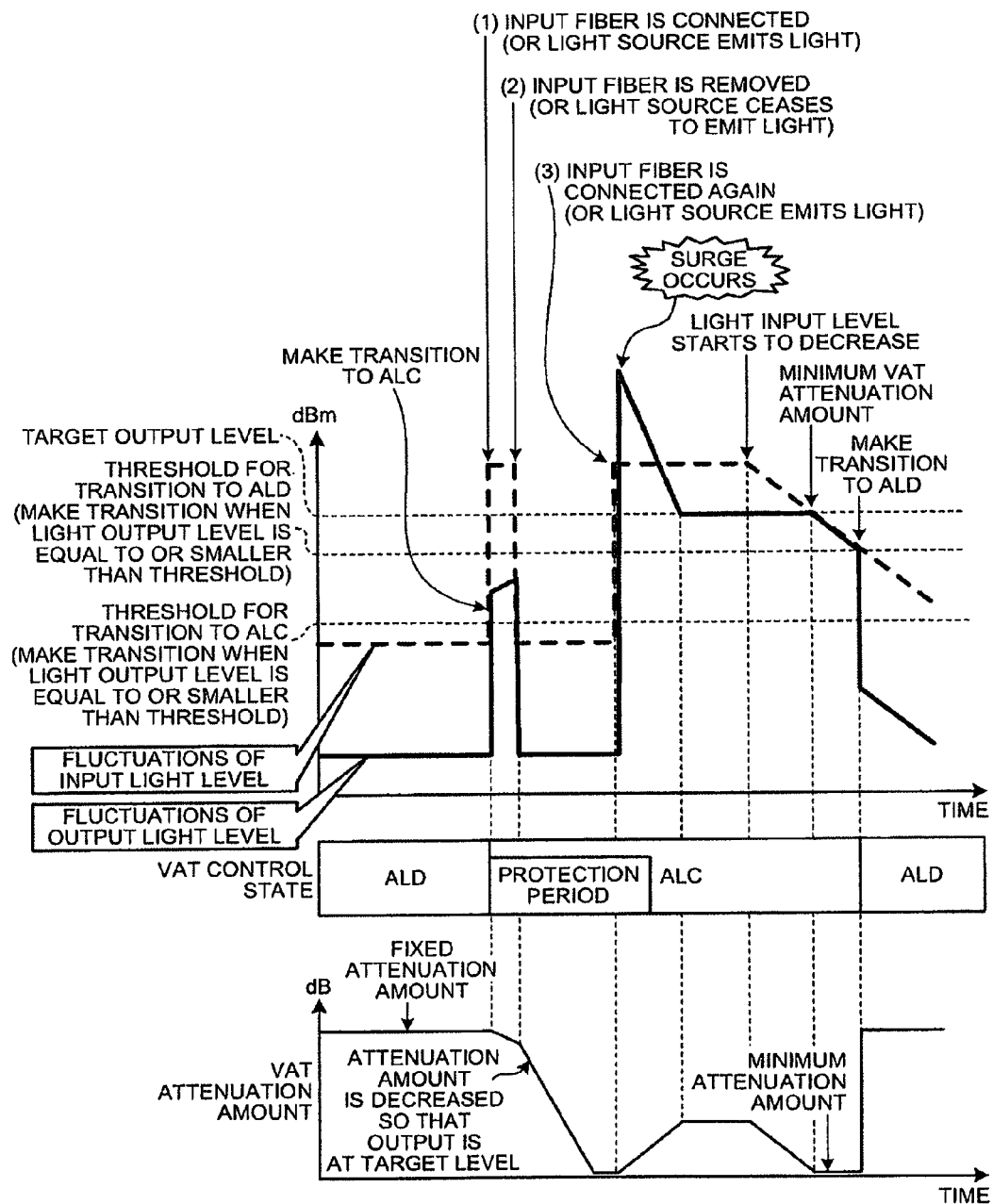
FIG. 19 is a drawing for explaining a conventional technology.

Thus, in the following, an example of a computer executing an optical multiplexing program having functions similar to those of the MUX unit 100 explained in the embodiments is explained. FIG. 16 is a drawing of a computer executing an optical multiplexing program.

As depicted in the drawing, a computer 200 includes an input unit 210, an output unit 220, a Hard Disk Drive (HDD) 230, a Random Access Memory (RAM) 240, and a CPU 250, which are connected each other via a bus 300.

The input unit 210 accepts an input of various data from a user. The output unit 220 displays various information. The HDD 230 has stored therein information necessary for performing various processes by the CPU 250. The RAM 240 has temporarily stored therein various information. The CPU 250 performs various computing processes.

As depicted in FIG. 16, the HDD 230 has previously stored therein an optical multiplexing program 231 achieving functions similar to those of the processor 140 of the MUX unit 100 explained in the embodiments above and optical multiplexing data 232 similar to the parameters stored in the memory 130.

Note that this optical multiplexing program 231 can be distributed as appropriate to be stored in a storage unit of another computer communicably connected via a network.

With the CPU 250 reading this optical multiplexing program 231 from the HDD 230 and developing the program onto the RAM 240, as depicted in FIG. 16, the optical multiplexing program 231 can function as an optical multiplexing process 241.

The optical multiplexing process 241 reads from the HDD 230 optical multiplexing data 232 to develop the data on the assigned area in the RAM 240, performing the various processes based on the developed data or others.

The optical multiplexing process 241 corresponds to the process executed in the processor 140 of the MUX unit 100 depicted in FIG. 3 (or FIG. 4).

Note that the optical multiplexing program 231 is not necessarily stored in the HDD 230 from the start. For example, the optical multiplexing program 231 may be stored in a "portable physical medium", such as a flexible disk (FD), a compact-disk read only memory (CD-ROM), a digital versatile disk (DVD), an magneto-optical disk, or an Integrated Circuit (IC) card, or "another computer (or server)" connected to the computer 200 via a public line, the Internet, a Local-Area Network (LAN), a Wide-Area Network (WAN), or the like, and may be read by the computer 200 therefrom for execution.

(3) Optical Multiplexing Method

With the MUX unit 100 explained in the embodiments, the following optical multiplexing method is achieved.

That is, an optical multiplexing method is achieved including: a step of determining during a protection period of controlling so as not to perform a state transition even if an output level satisfies a condition for causing the state transition from a feedback control state of controlling so as to gradually increase a level of output light by adjusting the attenuation amount for attenuating input light to a fixed-attenuation-amount control state of controlling so as to attenuate the level of the output light by using the fixed attenuation amount, whether the level of output light is below a predetermined value equal to or smaller than a threshold for a state transition from the fixed-attenuation-amount control state to the feedback control state (see step S501 in FIG. 5 and step S1316 in FIGS. 13A and 13B, for example); and a controlling step of controlling so as to cause a transition from the feedback control state to the fixed-attenuation-amount control state when it is determined that the level of the output light is below the predetermined value equal to or smaller than the threshold for the state transition to the feedback control state (see step S502 in FIG. 5 and step S1317 in FIGS. 13A and 13B, for example).

According to the present invention, an effect of suppressing the occurrence of a surge and preventing a main-signal error and a device breakdown due to the occurrence of a surge can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An optical transmitting apparatus, comprising:
    a variable optical attenuator that transits to a first state when a level of output light of the variable optical attenuator exceeds a first threshold, and transits to a second state when the level of output light falls below a second threshold which is higher than the first threshold, an attenuation amount of the variable optical attenuator being controlled to vary according to feedback control in the first state and to be constant in the second state;
    a determining unit that determines, during a protection period, whether a level of output light from the variable optical attenuator falls below the first threshold, the protection period being a predetermined time period after the variable optical attenuator transits from the second state to the first state during which state transition is prohibited; and a control unit that controls the variable optical attenuator to transit from the first state to the second state when determining that the level of the output light falls below the first threshold.

2. The optical transmitting apparatus according to claim 1, comprising:

a memory that stores a predetermined value of difference in levels of output light and a third threshold to be compared with the level of output light, and wherein the control unit controls the variable optical attenuator not to decrease the attenuation amount when the determining unit determines that a difference between a level of the output light detected at a previous detection cycle and a level of the output light detected at a current detection cycle is larger than the predetermined value stored in the memory.

3. The optical transmitting apparatus according to claim 2, wherein the control unit controls the variable optical attenuator not to change the attenuation amount when the determining unit determines that the difference is larger than the predetermined value stored in the memory and the level of the output light is equal to or smaller than the third threshold which is higher than the first threshold.

4. The optical transmitting apparatus according to claim 2, wherein the control unit controls the variable optical attenuator to increase the attenuation amount when the determining unit determines that the difference is larger than the predetermined value stored in the memory and the level of the output light is greater than the third threshold which is higher than the first threshold.

5. An optical multiplexing unit, comprising:

a variable optical attenuator that transits to a first state when a level of output light of the variable optical attenuator exceeds a first threshold, and transits to a second state when the level of output light falls below a second threshold which is higher than the first threshold, an attenuation amount of the variable optical attenuator being controlled to vary according to feedback control in the first state and to be constant in the second state;

a determining unit that determines, during a protection period, whether a level of output light from the variable optical attenuator falls below the first threshold, the protection period being a predetermined time period after the variable optical attenuator transits from the second state to the first state during which state transition is prohibited; and a control unit that controls the variable optical attenuator to transmit from the first state to the second state when determining that the level of the output light falls below the first threshold.

6. A non-transitory computer readable storage medium containing instructions for optical multiplexing, wherein the instructions, when executed by a computer, cause the computer to perform:

determining, during a protection period, whether a level of output light from a variable optical attenuator falls below a first threshold, the variable optical attenuator transiting to a first state when a level of output light of the variable optical attenuator exceeds the first threshold, and transiting to a second state when the level of output light falls below a second threshold which is higher than the first threshold, an attenuation amount of the variable optical attenuator being controlled to vary according to feedback control in the first state and to be constant in the second state, the protection period being a predetermined time period after the variable optical attenuator transits from the second state to the first state during which state transition is prohibited; and controlling the variable optical attenuator to transit from the first state to the second state when determining that the level of the output light falls below the first threshold.

7. An optical multiplexing method, comprising:

determining, during a protection period, whether a level of output light from a variable optical attenuator falls below a first threshold, the variable optical attenuator transiting to a first state when a level of output light of the variable optical attenuator exceeds the first threshold, and transiting to a second state when the level of output light falls below a second threshold which is higher than the first threshold, an attenuation amount of the variable optical attenuator being controlled to vary according to feedback control in the first state and to be constant in the second state, the protection period being a predetermined time period after the variable optical attenuator transits from the second state to the first state during which state transition is prohibited; and controlling the variable optical attenuator to transit from the first state to the second state when determining that the level of the output light falls below the first threshold.

* * * * *